United States Patent Office 3,408,340
Patented Oct. 29, 1968

3,408,340
PROCESS FOR THE POLYMERIZATION OF OLEFINS WITH THE TRI-COMPONENT CATALYST INCLUDING DI-SUBSTITUTED POLYSILOXANE
Tsutomu Tanaka and Tadaichi Tokuzumi, Hiroshima-ken, and Hiroshi Fujimura, Kuga-gun, Yamaguchi-ken, Japan, assignors to Mitsui Petrochemical Industries, Ltd., Tokyo, Japan, a corporation of Japan
No Drawing. Filed Feb. 5, 1964, Ser. No. 342,816
Claims priority, application Japan, Feb. 15, 1963, 38/6,160; Feb. 26, 1963, 38/8,544
16 Claims. (Cl. 260—88.2)

ABSTRACT OF THE DISCLOSURE

Process of polymerizing olefins in the presence of a catalyst composition comprising (1) a hydrocarbon-insoluble reaction product of a compound of transition metal of Groups IV-A, V-A, VI-A or VIII or manganese with an organometallic compound of alkali, alkaline earth, zinc, earth or rare earth metal, (2) an organometallic compound of alkali, alkaline earth, zinc, earth or rare earth metal, and (3) a dialkyl polysiloxane, diaryl polysiloxane or alkylaryl polysiloxane in certain proportions in an inert solvent.

---

The present invention relates to a process for the polymerization of olefins, wherein a new catalyst system is used.

In this specification, by the term "polymerization" we mean polymerization and copolymerization.

It is well known as a process for polymerizing olefins a process wherein a mixture of a compound of metal of Groups IV-A, V-A, VI-A or VIII of the Periodic Table with an organometallic compound of Groups II or III of the Periodic Table is used as catalyst under relatively mild temperature and pressure conditions. Generally speaking, however, according to this process, yield of polymer is low and it is not always possible to obtain the result of polymerization with high reproducibility. For instance, it has often been experienced that even when the reactions are carried out under the same conditions, marked differences are caused in respect of such points as yield, molecular weight, particle sizes or forms of polymers, etc.

It is the main object of the present invention to provide a process for the polymerization of olefins for improving such defects of the known process by using new catalyst composition having high activity and stability and for obtaining polyolefins having high stereoregularity and excellent physical properties at a high yield and with good reproducibility.

According to the present invention the improved process for the polymerization of olefins comprises contacting at least one of ethylenically unsaturated hydrocarbons with a catalyst composition comprising (1) a hydrocarbon-insoluble reaction product formed by reaction of a compound of a transition metal selected from the group consisting of metal of Groups IV-A, V-A, VI-A and VIII of the Periodic Table and manganese with an organometallic compound of a metal selected from the group consisting of alkali metals, alkaline earth metals, zinc, earth metals and the rare earth metals (2) an organometallic compound of a metal selected from the group consisting of alkali metals, alkaline earth metals, zinc, earth metals and the rare earth metals and (3) a substance selected from the group consisting of organopolybasic acid esters, esters of carboxylic acid with polyhydric alcohol and polysiloxanes.

The process of the present invention is applicable to the polymerization of any ethylenically unsaturated hydrocarbons such as those having vinyl, vinylidene or vinylene group or a mixture thereof. The present invention is particularly important for the polymerization of monoethylenically unsaturated hydrocarbons wherein the unsaturated group is vinylidene group having the general formula:

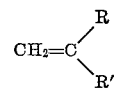

wherein R is alkyl group and R' is alkyl, cycloalkyl, aralkyl, or aryl or alkaryl group or monoethylenically unsaturated hydrocarbons wherein the unsaturated group is vinyl group having the general formula:

$$CH_2=CHR$$

wherein R is hydrogen atom, linear or branched chain alkyl, cycloalkyl, aryl, aralkyl or alkaryl group or polyethylenically unsaturated hydrocarbons such as conjugated diolefins.

The compound of transition metal used in the first catalyst component may be a compound of any metal of Groups IV-A, V-A, VI A or VIII of the Periodic Table, i.e., titanium, zirconium, hafnium, thorium, vanadium, columbium, tantalum, chromium, molybdenum, tungsten, uranium, iron, cobalt, nickel, etc., or manganese. The transition metal compound may be an inorganic salt such as a halide, oxyhalide, etc. or an organic salt or complex such as an acetylacetonate, etc. Typical examples of the transition metal compounds are titanium tetrachloride, zirconium tetrachloride, manganous chloride, nickelous chloride, zirconium acetylacetonate, vanadium oxyacetylacetonate, chromium acetylacetonate, etc.

The organometallic compound which is reacted with the said transition metal compound in the first catalyst component may be any organic compound of an alkali metal, alkaline earth metal, zinc, earth metal or rare earth metal, as for example, diethylmagnesium, diethylzinc, butylmagnesium chloride, triethylaluminum, diethylaluminum chloride, ethylaluminum dichloride, aluminum sesquichloride.

The organometallic compound used as the second catalyst component in the present invention may be any compound selected from the same groups as used for the preparation of the hydrocarbon-insoluble first catalyst component and may be the same or different compound as those used for the preparation of the said first catalyst component.

As the third catalyst component of the present invention, wide variety of organopolybasic acid esters, esters of carboxylic acid with polyhydric alcohol or polysiloxanes may be used. Examples of the organo-polybasic acid esters are esters of aliphatic alcohol such as methyl, ethyl, butyl, hexyl, octyl and a higher alcohol with aliphatic dibasic acid such as succinic acid and adipic acid or with aromatic dibasic acid such as phthalic acid, or esters of aromatic alcohol such as benzyl alcohol and phenylethyl alcohol with the aliphatic or aromatic dibasic acid mentioned above. In particular, it is very effective to use dibutyl phthalate, dioctyl phthalate and higher alkyl phthalates for obtaining the product in a high yield. The preferred polyhydric alcohol esters with carboxylic acid may be fatty acid esters of the aliphatic polyhydric alcohol such as ethylene glycol, glycerine, diethylene glycol, etc., and, in particular, higher fatty acid glycerides, i.e., animal or vegetable fats and oils are preferably used.

As the polysiloxanes, it may be used any linear or cyclic polysiloxane having the formula:

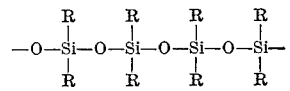

(where R represents alkyl group, e.g. methyl group or aryl group, e.g. phenyl group) and having such wide viscosity range as from several centistokes to 1,000,000 centistokes.

In the preparation of the first catalyst component, the molar ratio of the organometallic compound to the transition metal compound may be varied over the wide range and preferably the ratio of 0.2–0.8:1 may be used. The reaction temperature may also be varied over the wide range and the most preferred range is 30 to 50° C. The hydrocarbon-insoluble reaction product thus formed is separated from the other reaction mixture by decantation, filtration, etc., and is fully washed with liquid saturated hydrocarbon. The obtained product is used as the first catalyst component of the present invention in the form of suspension in liquid saturated hydrocarbon.

The quantities of the three catalyst components to be used in the polymerization reaction according to the present invention may be varied within the moderately wide range. The typical quantity of the first catalyst component is 2 to 100 millimoles, preferably 5 to 80 millimoles per liter of inert organic solvent which is generally used in polymerization reaction as a reaction medium. The quantity of the second catalyst component may be 2 to 100, preferably 5 to 30 millimoles per liter of the said solvent. The third catalyst component may preferably be used in the range of 0.001 to 0.5% by weight per 1 liter of the said solvent, but, if desired, larger quantities of the said component may be used without preventing the reaction.

It is preferable to prepare the aforesaid three components which constitute the catalyst composition in the present invention just before the beginning of polymerization reaction. Suitably, this preparation is carried out by adding the first catalyst component to an inert solvent to form a suspension and adding the second and third catalyst component to the said suspension.

Further, we have found that by adding an appropriate quantity of hydrogen during the polymerization reaction according to the present invention it is possible to optionally adjust the molecular weight of polyolefin without involving any undesirable effect on the yield and stereoregularity of polyolefins obtained.

Therefore, we also provide the further improved process for the polymerization of olefins characterized by carrying out the reaction in the presence of hydrogen in order to obtain polyolefins having any desired molecular weight and uniform particle size with a high yield and good reproducibility.

The quantity of hydrogen to be added may be varied over a wide range depending upon to what extent the molecular weight of polymers can be lowered as compared with the case where hydrogen is not added, and depending upon catalyst, monomer, temperature, pressure, etc. which are employed. Generally speaking, the quantity of hydrogen to be added is 0.001–99 mol percent, especially 0.01–20 mol percent of monomer or monomers fed into the polymerization system. The said quantity of hydrogen may be added at a time at the beginning of polymerization or at a certain stage during polymerization or in several times, splitting the amount, or continuously during polymerization. The hydrogen may be added to the reaction mixture after it has been mixed with inert gas such as nitrogen or with gaseous monomer, or may be held over the reaction mixture as a blanket.

The aforesaid processes for polymerization of olefins according to the present invention can be carried out in various ways, for example by batch system or continuous system, using or not using a reaction medium. As reaction medium, may be used inert organic diluents, for example, aliphatic hydrocarbons such as hexane, heptane; cyclic hydrocarbons such as cyclohexane; aromatic hydrocarbons such as benzene, toluene, xylene; halogenated aromatic hydrocarbons such as chlorobenzene, chloronaphthalene.

The temperature and pressure to be employed in the polymerization process of the present invention may be varied depending on the kind of monomer or activity of the catalyst system. In general, the polymerization can desirably be carried out at room temperature or at somewhat higher temperature and under atmospheric pressure or under somewhat higher pressure, but, if desired, a temperature between —50° C. and 150° C. and a pressure between almost vacuum and 50 atmospheric pressures may also be used.

The process according to the present invention is further illustrated in the following examples.

Example 1.—Preparation of hydrocarbon-insoluble catalyst component

Under nitrogen atmosphere, 386 millimoles of diethyl aluminium monochloride was dissolved in 1 liter of completely dehydrated and purified kerosene, and 594 millimoles of titanium tetrachloride was added dropwise thereto during about 30 minutes while the mixture being stirred strongly at a temperature below room temperature and the reaction was further carried out for 3 hours with stirring the solution. The insoluble precipitate thus formed was separated by decantation and was used as a suspension after washing it several times with the purified kerosene. In this case, a precipitate containing titanium trichloride was produced, and its concentration could be quantified by titration.

Preparation of catalyst and polymerization of an olefin

Under nitrogen atmosphere and at room temperature, 250 cc. of n-hexane was charged into three polymerization vessels with an agitator (A), (B) and (C), respectively. 0.10 cc. of dioctyl phthalate was then added to the vessels (B) and (C), respectively. Into each vessel of (A), (B) and (C), 3.75 millimoles (calculated as $TiCl_3$) of the hydrocarbon-insoluble catalyst component obtained by the above preparation and 2.5 millimoles of diethylzinc were added, thereafter the vessel was heated to 80° C. Ethylene was fed into the vessels (A) and (B), respectively, while a gaseous mixture of ethylene and hydrogen containing 10 mol percent of hydrogen was fed into the vessel (C), thus the polymerization reactions were carried out at the atmospheric pressure for 3 hours, and the results obtained are as follows:

| | Product—Polyethylene | | |
| --- | --- | --- | --- |
| | Yield (g.) | Apparent density | Molecular weight |
| Vessel: | | | |
| A | 78 | 0.305 | 690,000 |
| B | 123 | 0.321 | 720,000 |
| C | 125 | 0.326 | 210,000 |

It is clearly recognized that the polymerization rate can be increased by adding the ester and that the molecular weight of the obtained polymer can be lowered by further adding hydrogen without influencing undesirable for the polymerization rate.

Example 2

Under nitrogen atmosphere and at room temperature, 750 cc. of n-hexane was charged into three autoclaves with an agitator (A), (B) and (C), respectively, and then 0.3 cc. of glyceryl tristearate was added to the autoclaves (B) and (C).

Into each of these vessels (A), (B) and (C), 22.5 millimoles of the same hydrocarbon-insoluble catalyst component as used in Example 1 and 11.3 millimoles of triethylaluminium were added. Hydrogen was introduced into the vessel (C) only until the pressure therein was reached to 0.8 atmospheric pressures gauge. The polymerization reaction took place immediately after introducing propylene at the rate of 60 liters per hour into the each vessel of (A), (B) and (C) and was continued until the inner pressure was reached to 6 atmospheric pressures gauge in the vessels (A) and (B) and until the inner pressure reached to 6.8 atmospheric pressures gauge in the vessel (C). The results are shown in the following table.

|        | Product—Polypropylene | |
|--------|-----------|------------------|
|        | Yield (g.) | Molecular weight |
| Vessel: |  |  |
| A | 281 | 230,000 |
| B | 380 | 215,000 |
| C | 388 | 43,000 |

In the three cases, the amounts of boiling heptane insoluble part of the produced polypropylene was approximately equal and was in the range of 88 to 91%. Any undesirable influence for stereoregularity of polymers resulting from the addition of esters and/or hydrogen was not found.

Example 3

250 cc. of n-hexane, 0.10 g. of diphenyl polysiloxane having the viscosity of 100,000 centistokes, 5 millimoles of the same hydrocarbon-insoluble catalyst components as used in Example 1 and 3 millimoles of triethylaluminium were charged together into a polymerization vessel with an agitator and the temperature was raised to 70° C.

After butene-1 was continuously introduced into the vessel for 3 hours, 84 g. of polybutene-1 having a molecular weight of 45,000 was obtained.

When the above process was repeated without adding the polysiloxane, the yield of polybutene-1 was 59 g.

Example 4

750 cc. of n-hexane, 0.15 cc. of dimethyl polysiloxane having the viscosity of 100 centistokes, 30 millimoles of the same hydrocarbon-insoluble catalyst component as used in Example 1 and 30 millimoles of diethylaluminium chloride were charged together into an autoclave with an agitator and the temperature was raised to 70° C.

A mixed gas containing propylene and ethylene at the ratio of 20:80 was introduced into the autoclave at the rate of 30 liters per hour to copolymerize them, and the copolymerization reaction was continued until the internal pressure was reached to 5 atmospheric pressures gauge. As the result, 128 g. of elastic ethylene-propylene copolymer whose propylene content was about 17 mol percent and molecular weight was about 100,000 was obtained.

For comparison, the copolymerization was carried out without adding the polysiloxane. The internal pressure of reactor was raised more quickly, and when the internal pressure was reached to 5 atmospheric pressures gauge, the yield of copolymer was 95 g. It is apparent that when polysiloxane was added, the polymerization rate was higher than when polysiloxane was not added.

Example 5

In a stream of nitrogen, 250 cc. of kerosene and 0.10 cc. of rape-seed oil were charged into a polymerization vessel with an agitator, and 10 millimoles of the same hydrocarbon-insoluble catalyst component as used in Example 1 was added thereto. Further, 5 millimoles of diethylzinc was added, thereafter the temperature was raised to 70° C., and then a mixed gas containing ethylene and butene-1 at the proportion of buten-1 of 5 mol percent was introduced. The copolymerization reaction took place immediately after introducing the mixed gas, after 3 hours 116 g. of copolymer having 3 mol percent of butene-1 content, 0.307 of apparent density and 320,000 of molecular weight was obtained.

For comparison, the copolymerization reaction was repeated under the same conditions except that rape-seed oil was not added, and the yield of copolymer after 3 hours was 71 g.

Example 6

300 cc. of n-hexane, 0.10 cc. of dimethyl polysiloxane having the viscosity of 200 centistokes, 120 g. of styrene, 12 millimoles of the same hydrocarbon-insoluble catalyst component as used in Example 1 and 24 millimoles of triethylaluminium were charged together into a polymerization vessel with an agitator. The temperature was raised to 80° C. and after the reaction was continued for 10 hours while agitating, total of the polymer formed was 70 g. The acetone-insoluble part in polymer was 87% and the remains comprised oil and acetone-soluble solid material.

For comparison, this process was repeated under the same conditions except that dimethyl polysiloxane was not added, and, as the result, 58 g. of the total polymer whose acetone-insoluble part was 84% was obtained.

What we claim is:

1. A process for the polymerization of olefins which comprises contacting at least one of ethylenically unsaturated hydrocarbons with a catalyst composition comprising (1) a hydrocarbon-insoluble reaction product formed by reaction of a compound of a transition metal selected from the group consisting of metals of Groups IV–A, V–A, VI–A and VIII of the Periodic Table and manganese with an organometallic compound of a metal selected from the group consisting of alkali metals, alkaline earth metals, zinc, earth metals and the rare earth metals (2) an organomettalic compound of a metal selected from the group consisting of alkali metals, alkaline earth metals, zinc, earth metals and the rare earth metals, and (3) a polysiloxane selected from the group consisting of dialkyl polysiloxanes, diaryl polysiloxanes and alkylaryl polysiloxanes in the presence of an inert solvent, the proportions of the catalyst components (1), (2) and (3) in the reaction system being in the range of 2 to 100 millimoles, 2 to 100 millimoles and at least 0.001 to 0.5% by weight per liter of the inert solvent, respectively.

2. A process as claimed in claim 1 wherein the ethylenically unsaturated hydrocarbon is a monoethylenically unsaturated hydrocarbon.

3. A process as claimed in claim 2 wherein the monoethylenically unsaturated hydrocarbon is a member selected from the group consisting of ethylene, propylene, buten-1 and styrene.

4. A process as claimed in claim 1 wherein the ethylenically unsaturated hydrocarbon is a conjugated diolefin.

5. A process as claimed in claim 1 wherein ethylene is copolymerized with a member selected from the group consisting of propylene and butene-1.

6. A process claimed in claim 1 wherein the first catalyst component comprises the hydrocarbon-insoluble reaction product of a titanium compound with an organoaluminium compound.

7. A process claimed in claim 6 wherein the titanium compound is titanium tetrachloride and the organo-aluminium compound is an alkylaluminium compound.

8. A process as claimed in claim 1 wherein the second catalyst component is an organo-aluminium compound.

9. A process as claimed in claim 1 wherein the second catalyst component is an organo-zinc compound.

10. A process as claimed in claim 8 wherein the organoaluminium compound is a trialkylaluminium.

11. A process as claimed in claim 1 wherein the inert solvent is a member selected from the group consisting of aliphatic saturated hydrocarbons, cycloaliphatic hydrocarbons, aromatic hydrocarbons and halogenated aromatic hydrocarbons.

12. A process as claimed in claim 1 wherein the polymerization reaction is carried out in the presence of hydrogen.

13. A process as claimed in claim 12 wherein hydrogen is used in an amount of 0.001 to 99 mol percent, preferably 0.01 to 20 mol percent of monomer or monomers fed into the polymerization system.

14. The process as claimed in claim 1, wherein the polysiloxane is dimethyl polysiloxane.

15. The process as claimed in claim 1, wherein the polysiloxane is diphenyl polysiloxane.

16. The process as claimed in claim 1, wherein the polysiloxane is methyl phenyl polysiloxane.

References Cited

UNITED STATES PATENTS

| | | | |
|---|---|---|---|
| 3,202,617 | 8/1965 | Enk et al. | 260—99.9 |
| 2,965,627 | 12/1960 | Field | 260—94.9 |
| 3,159,615 | 12/1964 | Weeks | 260—94.9 |
| 3,208,985 | 9/1965 | Piekarski | 260—94.9 |
| 3,230,208 | 1/1966 | Coover | 260—94.9 |
| 3,051,690 | 8/1962 | Vandenberg | 260—94.9 |

FOREIGN PATENTS 848,182   9/1960   Great Britain.

JOSEPH L. SCHOFER, *Primary Examiner.*

M. KURTZMAN, *Assistant Examiner.*